United States Patent [19]

Silva et al.

[11] Patent Number: 5,404,267
[45] Date of Patent: Apr. 4, 1995

[54] BIDEXTROUS PORTABLE DATA ENTRY DEVICE

[75] Inventors: Dennis Silva, San Jose; Steven D. Friend, Cupertino, both of Calif.

[73] Assignee: AST Research, Inc., Irvine, Calif.

[21] Appl. No.: 24,694

[22] Filed: Mar. 1, 1993

[51] Int. Cl.⁶ ............ H05K 5/02; G06F 1/16; A47B 95/02
[52] U.S. Cl. .................... 361/683; 16/125; 312/223.2
[58] Field of Search ............ 16/125, 124; 395/169, 395/173, 905; 340/825.44; 364/708.1; 235/1 D, 145 R, 146, 61 R, 472; 361/679–684, 686, 731–733, 740, 741, 759, 801, 803, 823–825; 429/96–100; 312/223.2

[56] References Cited

U.S. PATENT DOCUMENTS

| | | | |
|---|---|---|---|
| 2,537,750 | 1/1951 | Gretschel | 16/126 X |
| 4,020,527 | 5/1977 | O'Neill | 235/1 D X |
| 4,053,047 | 10/1977 | Andreaggi | 206/305 X |
| 4,241,810 | 12/1980 | Newlon | 206/521 X |
| 4,340,990 | 7/1982 | Seynhaeve | 16/126 |
| 4,364,150 | 12/1982 | Remington | 16/126 X |
| 4,393,540 | 7/1983 | Yamamoto et al. | 16/114 |
| 4,424,841 | 1/1984 | Smith | 190/116 X |
| 4,754,858 | 7/1988 | Robinson | 190/115 |
| 4,790,431 | 12/1988 | Reel et al. | 206/523 X |
| 4,824,059 | 4/1989 | Butler | 206/523 X |
| 4,836,256 | 6/1989 | Meliconi | 206/523 X |
| 4,965,690 | 10/1990 | Tanaka et al. | . |
| 5,002,184 | 3/1991 | Lloyd | 206/305 |
| 5,006,699 | 4/1991 | Felkner et al. | 235/472 |
| 5,009,950 | 4/1991 | Wagner et al. | . |
| 5,023,824 | 6/1991 | Chadima, Jr. et al. | 235/1 D X |
| 5,142,131 | 8/1992 | Collins, Jr. et al. | 235/472 |
| 5,267,181 | 11/1993 | George | 364/708.1 X |

*Primary Examiner*—Michael W. Phillips
*Attorney, Agent, or Firm*—Townsend and Townsend Khourie and Crew

[57] ABSTRACT

A portable data entry unit capable of being set up for right handed or left handed operation. The lower housing of a casement for the data entry unit is provided with four carrier mount receiving regions configured to secure a strap bracket. Two strap carrier mounts are used, one each in an appropriately located region for either handed configuration. The rear external surface of the lower housing has a central recessed portion flanked by two support portions. Each support portion is provided with a co-molded surface region to enhance the gripability of the unit.

11 Claims, 3 Drawing Sheets

BIDEXTROUS PORTABLE DATA ENTRY DEVICE

BACKGROUND OF THE INVENTION

This invention relates to portable data entry devices capable of hand held use for data collection.

Portable data entry devices are known which are used for data collection purposes. Such devices are used in a wide variety of applications, such as in the fields of hand held computers—particularly those employing stylus operated data entry displays, portable data entry devices employed by merchandise delivery services, portable data entry devices used by field service personnel in the utilities industries and the like. Devices of this type typically employ a data entry mechanism, such as a stylus, a bar code reader, or dedicated alphanumeric or function keys (or a combination of both), and a visible display to enable the user to verify the data entry. Both the data entry mechanism and the display are carried by a housing usually molded from a suitable plastic material, along with the electronic circuit components and battery power required to provide an operable self-contained unit.

In the past, the housing for such devices has been shaped as either a large tablet with substantial thickness required to enclose the electronic circuitry and the display device, or a relatively elongated housing with a smaller display having indentations molded into those portions of the housing surface intended to be gripped by the thumb and fingers of the user. For the latter type of device, it has been necessary to either mold a single version conformable with either a user's left hand or a user's right hand, or to provide two different models: one molded for a right handed user and one molded for a left handed user. The first approach suffers from the disadvantage of disregarding the preference of individual users, forcing a given user to use the device with a particular hand irrespective of the handedness of the user. The latter approach suffers from the disadvantage of requiring two sets of molds in order to produce both the right handed version and the left handed version. This two model approach is substantially more expensive to initially tool up and requires inventories of both types of device irregardless of the actual immediate demand.

A still further problem with all types of known hand held portable data entry devices has been the lack of satisfying aesthetic feel of the gripping surfaces to the user by virtue of the fact that the housings are typically molded from an impact resistant, hard and smooth plastic material. While efforts have been made to improve the feel, such as by providing a pebble grain finish in a manner analogous to that provided in camera cases and soft to the touch flexible plastic or rubber materials adhered to the outer surface of the housing, such results have not been entirely satisfactory to date.

SUMMARY OF THE INVENTION

The invention comprises a bidextrous hand held portable data entry device which can be configured for either right handed or left handed use after manufacture and which provides a pleasant feel to the contact and gripping surfaces of the housing.

From a first standpoint, the invention includes a housing having a front surface, a rear surface and peripheral side surfaces defining a right end, a left end, a top end and a bottom end of the housing; a display device carried by the housing and viewable from the front surface; data entry means carried by the housing and operable by a user from the front surface; and gripping means positioned adjacent the rear surface for facilitating hand held use of the data processor. The data entry means is preferably incorporated into the display device so that data entry can be effected manually by the user. In this embodiment, a mounting receptacle is preferably provided for removably receiving a stylus used in conjunction with the data entry means. The gripping means includes a removable bracket secured to the housing in the proximity of one of the peripheral side surfaces, and a strap attached to the bracket, the strap and the proximate portion of the rear surface defining a space for receiving the hand of a user. The bracket is attachable to the housing at two different alternate locations in the proximity of the right end and the left end so that the processor can be configured for both right handed and left handed use.

The rear surface of the housing includes a pair of laterally spaced outwardly extending support portions, and an intermediate recessed portion. The housing further includes a pair of bracket receiving portions for enabling the gripping means to be secured to the housing in the region of either one of the support portions so that one of the support portions serves as a hand support and the other one of the support portions serves as an arm support for the user. The support portion preferably includes an outer gripping material comolded with a base housing material and affording a soft, friction surface feel. The bracket preferably comprises a pair of strap carrier mounts each secured to the housing adjacent one of the pair of support portions. Each of the pair of strap carrier mounts comprises an L-shaped body member having a strap end receiving surface and a transverse mounting aperture for receiving a strap securing pin. The housing is provided with a plurality of strap carrier recesses adjacent the right end and the left end of the housing, the recesses being sized and configured to receive one end of the strap carrier mounts.

From another aspect, the invention comprises a two-piece housing for a portable data processor capable of hand held use, the housing comprising an upper housing member having a cut-out portion for providing a display viewing window and a downwardly extending peripheral wall portion, and a lower housing member having an upwardly extending peripheral wall portion dimensioned and configured to engage the downwardly extending peripheral wall portion of the upper housing member to form an enclosed volume therewith. The lower housing member has a bottom surface with a pair of laterally spaced outwardly extending support surface portions and an intermediate recessed portion extending therebetween, each of the support surface portions spanning the width of the peripheral wall portion and terminating in a different end region of the upwardly extending wall portion. A plurality of bracket receiving regions are formed at spaced locations in the upwardly extending peripheral wall portion, the bracket receiving regions being arranged in pairs with each pair located adjacent a different one of the support surface portions and each one of a given pair located adjacent a different one of the spanning ends of the associated support surface portion. The support surface portions include an outer gripping material co-molded with a base housing material. The upper housing member includes a mounting receptacle for removably receiving a stylus used to operate a data entry mechanism mounted in the display viewing window.

For a fuller understanding of the nature and advantages of the invention, reference should be had to the ensuing detailed description taken in conjunction with the accompanying drawings.

DESCRIPTION OF THE PREFERRED EMBODIMENTS

Figure 1A:
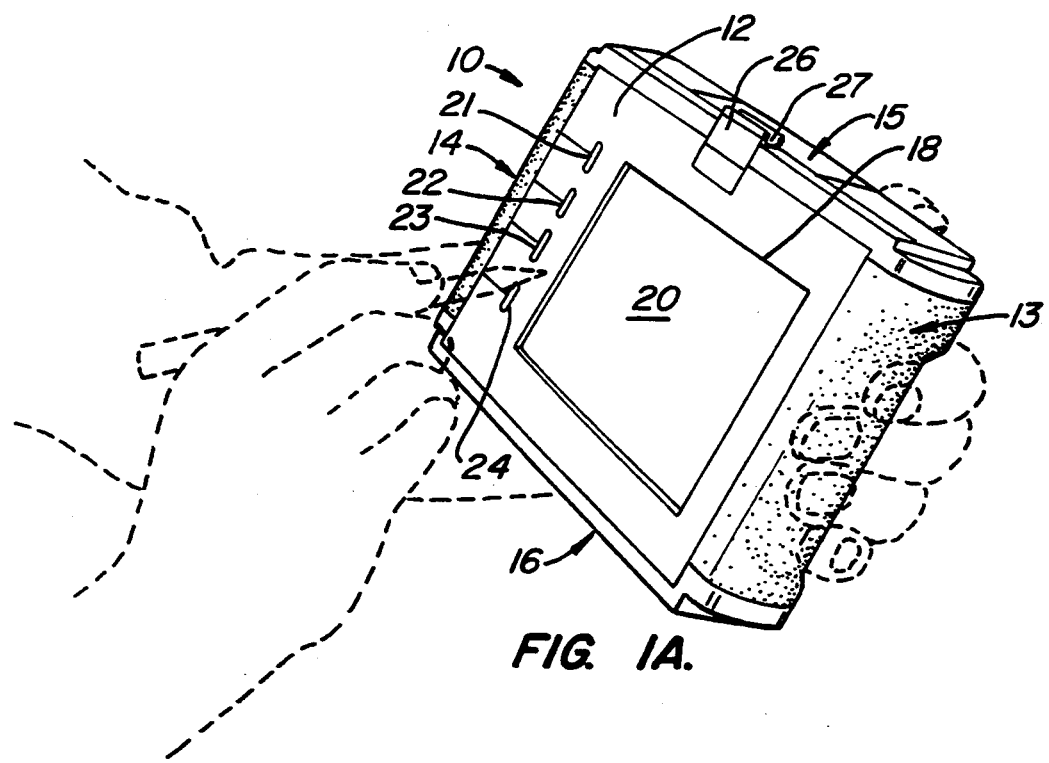
FIG. 1A is a perspective view of the preferred embodiment of the invention configured for a right handed user.
Figure 1B:
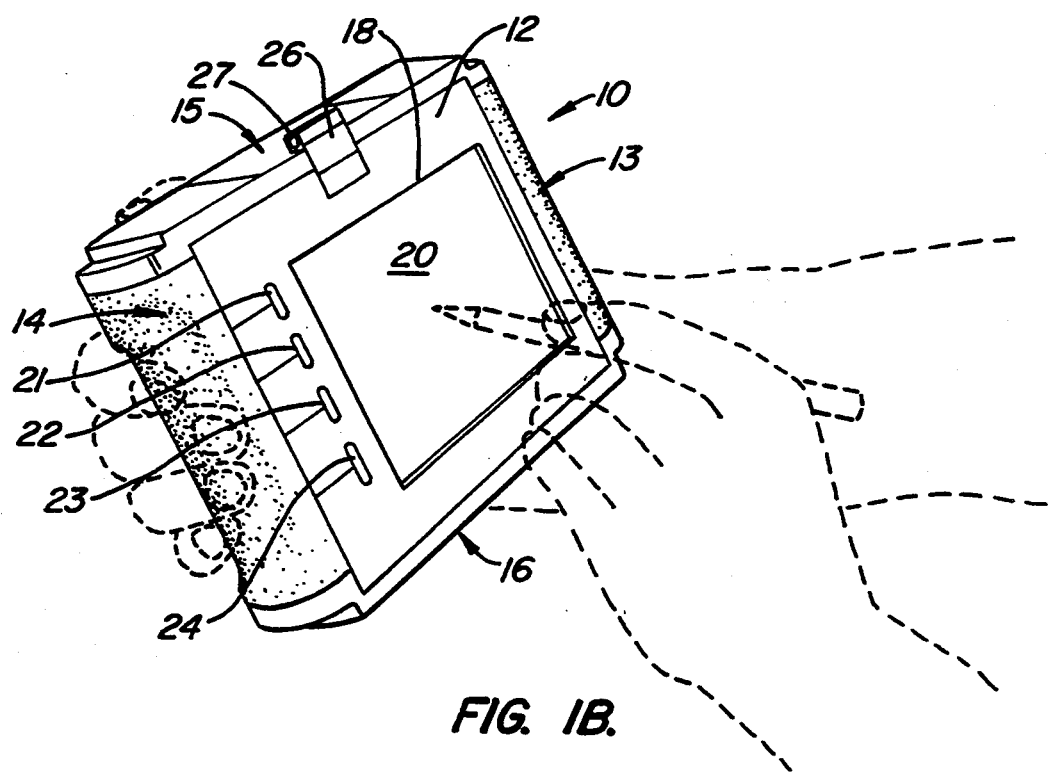
FIG. 1B is a perspective view of the preferred embodiment of the invention configured for a left handed user.

Turning now to the drawings, FIGS. 1A and 1B illustrate a preferred embodiment of the invention configured, respectively, for right handed and left handed use. As seen in these FIGS., a portable data entry device generally designated with reference numeral 10 has a generally rectangular housing with a front surface 12 and peripheral side surfaces 13–16 respectively defining a right end, a left end, a top end and a bottom end of the housing. Front surface 12 is provided with a rectangular cut-out portion 18 defining a display region 20. In the preferred embodiment illustrated, display region 20 is occupied by a combination display device and a stylus operated data entry device. In such devices, data can be entered by means of a pointed stylus illustrated in broken lines in both Figures, and such devices are well known in the art. In the preferred embodiment, the stylus operated data entry device comprises a 801006-00B type unit available from Logitech, of Fremont, Calif. Other specific examples of suitable devices will occur to those skilled in the art.

Also located along the front surface 12 of the housing of unit 10 are a plurality of touch operated function switch buttons 21–24 which are used in the preferred embodiment to control standby mode, the state of a display back light (i.e., on or off), display brightness and display contrast. Other numbers or types of function switches may be employed, as desired, depending on the requirements of any particular application. Integrally molded with the front surface 12 of the housing is a stylus mounting receptacle 26 having a longitudinally extending central recess 27 for removably receiving the stylus.

As noted above, FIGS. 1A and 1B respectively illustrate the preferred embodiment configured for right handed and left handed use. In these FIGS., portions of the user's hands and arms are illustrated with broken lines and the manner in which the device is held in either mode is suggested in each FIG. Thus, with reference to FIG. 1A for a right handed user the stylus is gripped with the right hand and the unit is held in the left hand, with the fingers of the left hand extending around the right end of the device housing and a portion of the rear of the housing resting against the inner part of the left forearm of the user. Similarly, in FIG. 1B the user grasps the stylus in the left hand and grasps the housing with the fingers of the right hand extending around the left end with a rear portion of the housing resting against the inner forearm of the right arm of the user. This bidextrous handling capability of the device is afforded by the mounting strap and bracket arrangement best illustrated in FIG. 2.

Figure 2:
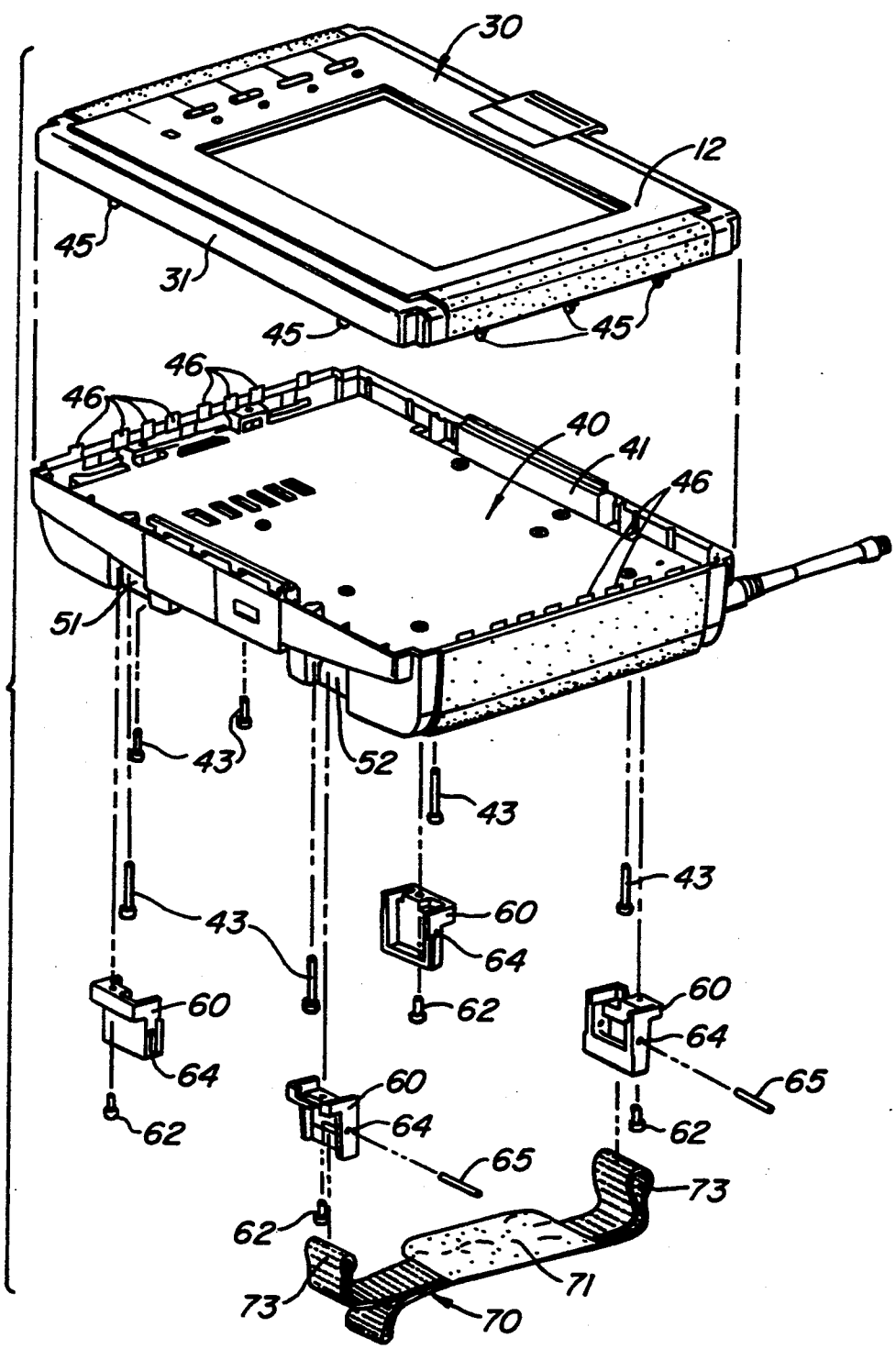
FIG. 2 is an exploded perspective view showing the major components of the preferred embodiment.

With reference to FIG. 2, the device housing is seen to be comprised of two major portions: an upper housing member 30 and a lower housing member 40. Upper housing member includes a downwardly extending peripheral wall portion 31 extending around the periphery of front surface 12. Lower housing member 40 has an upwardly extending peripheral wall portion generally designated with reference numeral 41 and having a perimeteral configuration conformable with that of downwardly extending wall portion 31 so that upper and lower housing members form an enclosed volume when secured together by suitable fastening means, such as illustrated mounting screws 43. To facilitate correct registration between upper housing member 30 and lower member housing 40, a plurality of locating ribs such as ribs 45 and 46 may be provided. Other suitable arrangements, such as integrally molded snap fasteners or the like may be provided, as desired.

Figure 3:
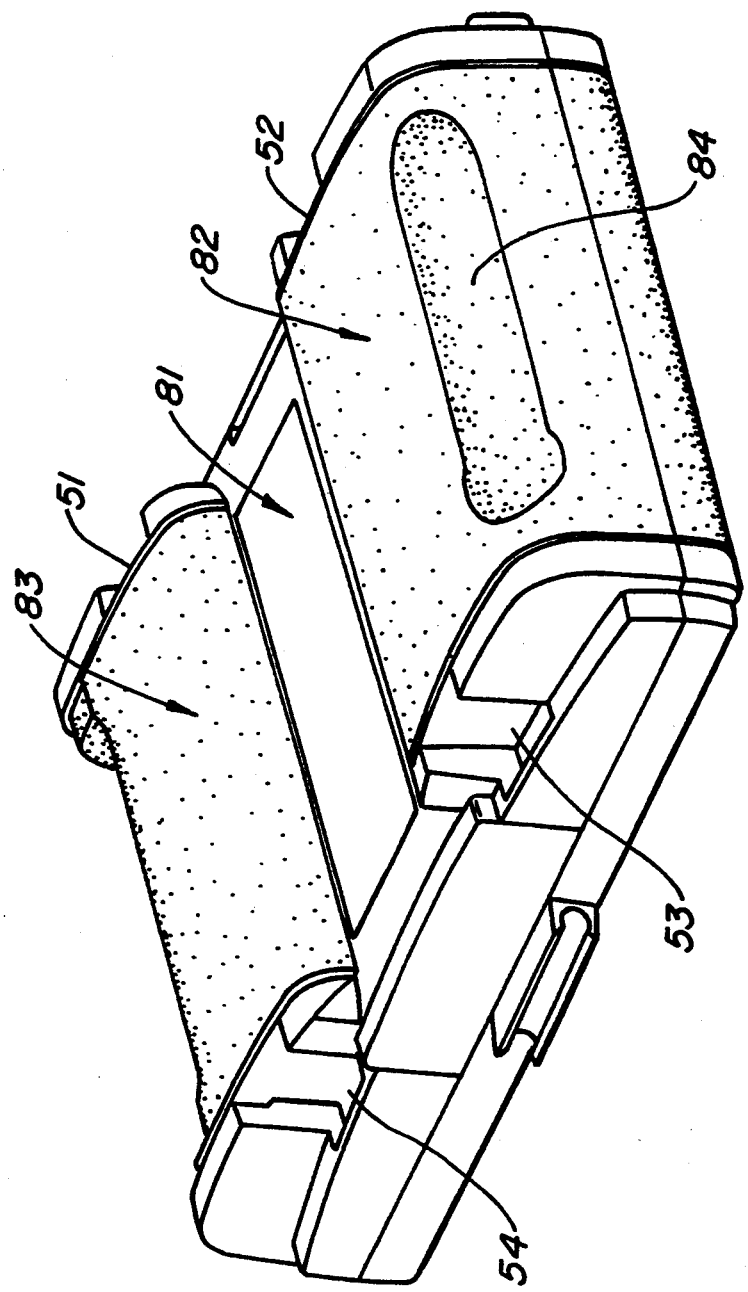
FIG. 3 is a perspective view showing the bottom surface of the preferred embodiment.

Molded into lower housing member 40 at four respective locations are a plurality of bracket receiving locations 51–54. As best illustrated in FIG. 3 for region 53, each of the bracket receiving regions is shaped so as to conformably receive a strap bracket 60 having a generally L-shaped configuration. The length and width dimensions of the various portions of strap bracket 60 are selected so as to provide a relatively close fit with a bracket receiving region 51–53 when inserted in the manner suggested in FIG. 2. When secured in place by a mounting screw 62, each bracket is supported along the base and the sidewalls thereof by the confining surfaces of the bracket receiving region 51–54. Screws 62 may be self-tapping screws or may be received in threaded sockets molded into the lower housing member 40 at appropriate registration locations.

A flexible strap 70 having a central pad portion 71 has a pair of looped ends 73 dimensioned to be received within the strap mounting space defined by flanking sidewalls of bracket 60. The sidewall portions of each bracket 60 are provided with a pin aperture 64 for receiving a strap mounting pin 65. The strap 70 is provided with a suitable length adjusting mechanism in order to provide the proper fit across the back of the user's hand, when installed. Preferably, strap 70 is fabricated from a web material and provided with complementary interfacing VELCRO releasable attaching material in order to provide the strap length adjustment.

In use, with the housing assembled, the device is readily configured for either right handed or left handed use by simply mounting a pair of brackets 60 in the appropriate bracket receiving regions 51–54. For example, to configure the unit for right handed use, brackets 60 are installed in receptacles 52 and 53, and strap 70 is attached by maneuvering the looped ends 73 into the bracket recesses and inserting the mounting pins 65 through the pin apertures 64 along the interior of the loop formed in each end 73 and into the opposing pin aperture 64. Thereafter, the user inserts the left hand from the left side of the housing between the strap 70 and the back surface of the lower housing member 40 to the position illustrated in broken lines in FIG. 1A, after which the length adjustment of the strap 70 can be made (if necessary). To configure the invention for left handed use, the brackets 60 are installed in bracket receiving regions 51, 54.

As best shown in FIG. 3, the rear surface of lower housing member 40 is formed in the shape of a central recessed region 81 which is flanked by outwardly extending support portions 82 and 83. The outer portion of each support portion 82, 83 is gently curved as shown for region 82 and provided with a slightly flattened surface contour 84 to enhance the ability of the user's fingers to form a firm grasp on the surface. To enhance the "feel" and improve the gripability of the device, the surfaces of support regions 82 and 83 and a portion of the left and right outer end wall surfaces of at least the lower housing member 40 are provided with a co-molded gripping material, preferably Dow PELATHANE, which is a urethane material. This provides a strongly bonded support surface which is slightly yielding to the touch and provides better friction than ordinary plastic case materials.

The upper and lower housing members are fabricated by first injection molding each member from a suitable plastic material in a separate molding tool and allowing the member to cure. The cooled member is removed from the first molding tool and placed in a second molding tool, which is constructed to include extremely tight shut-offs to prevent leakage when the co-mold is applied. The co-mold is then injection molded into controlled areas of the second mold which are bordered by the shut-offs. This hot injection produces a chemical reaction which bonds the substrate and the co-mold together. The bond so formed has been shown to remain intact over a wide range of environmental temperatures, e.g., from about 20° C. to about 80° C. The co-mold process is preferably applied to both the upper and lower housing members. However, if desired, it can be employed to provide the co-mold surface to the bottom housing member alone.

As will now be apparent, the invention provides a versatile, low cost bidextrous portable data unit with superior handling capabilities. In addition, the two handed nature of the device is afforded with only a single pair of universal strap brackets, with the brackets being used in pairs to configure the device for either right handed or left handed operation. In addition, no special technical skill is required to initially configure the unit or to change the configuration of the unit from right handed to left handed or vice versa. Still further, the co-molded surfaces afford superior touch and feel characteristics to the unit by providing a surface which is easier to grip than conventional plastic casements. Thus, the unit is less likely slip from the user's hand when wet or covered with perspiration.

While the above provides a full and complete disclosure of the preferred embodiment of the invention, various modifications, alternate constructions and equivalents may be employed as desired. For example, other suitable co-molding materials may be employed, as desired. Further, other types of data entry mechanisms than the stylus operated unit may be employed, if preferred. Therefore, the above description and illustrations should not construed as limiting the scope of the invention, which is defined by the appended claims.

What is claimed is:

1. A portable data processor capable of hand held use, said processor comprising:

a housing having a front surface, a rear surface and peripheral side surfaces defining a right end, a left end opposite said right end, a top end and a bottom end opposite said top end of said housing;

a display device carried by said housing and viewable from said front surface;

data entry means carried by said housing and operable by a user from said front surface; and gripping means positioned adjacent said rear surface for facilitating hand held use of said data processor, said gripping means including two removable strap carrier mounts secured to the rear surface of said housing in the proximity of one of said peripheral side surfaces and a strap attached to said mounts, said strap and the proximate portion of said rear surface defining a space for receiving the hand of a user, said mounts being attachable to said housing at two different alternate locations in the proximity of said right end and said left end eo that said processor can be configured for both right handed and left handed use.

2. The invention of claim 1 wherein said rear surface of said housing includes a pair of laterally spaced outwardly extending support portions and an intermediate recessed portion; and wherein said housing further includes two pairs of strap carrier mount receiving portions for enabling said gripping means to be secured to said housing in the region of either one of said support portions so that one of said support portions serves as a hand support and the other one of said support portions serves as an arm support for the user.

3. The invention of claim 2 wherein said support portions include an outer gripping material comolded with a base housing material.

4. The invention of claim 1 wherein each of said strap carrier mounts comprises an L-shaped body member having a strap end receiving surface and a transverse mounting aperture receiving a strap securing pin.

5. The invention of claim 1 wherein said housing is provided with a plurality of strap carrier mount recesses in proximity to the right end and the left end of said housing, said recesses being sized and configured to receive one of said mounts.

6. The invention of claim 1 wherein said data entry means is incorporated into said display device so that data entry can be effected manually by the user.

7. The invention of claim 1 wherein said housing further includes a mounting receptacle for removably receiving a stylus.

8. An electronic data entry device capable of hand-held use, said data entry device comprising:

a housing having a front surface, a rear surface and peripheral side surfaces defining a right end, a left end, a top end and a bottom end of said housing;

a display device carried by said housing and viewable from said front surface;

data entry means carried by said housing and operable by a user from said front surface; and gripping means positioned adjacent said rear surface for facilitating hand held use of said data entry device, said gripping means including a first strap carrier mount, secured to the rear surface in proximity to either the top end or the bottom end, and a second, removable strap carrier mount, said second mount being alternately securable to the rear surface of said housing in the proximity of one or the other of said right or left side surfaces and adjacent the bottom or top end opposite said first mount, and a strap attached to said first and second mounts, said strap and the proximate portion of said rear surface defining a space for receiving the hand of a user, so that said data entry device can be configured for both right- and left-handed use.

9. The invention of claim 8 wherein said rear surface of said housing includes a pair of laterally spaced outwardly extending support portions and an intermediate recessed portion; and wherein said housing further includes strap carrier mount receiving portions for enabling said second mount to be secured to said housing in the region of either one of said support portions so that one of said support portions serves as a hand support and the other one of said support portions serves as an arm support for the user.

10. the invention of claim 9 wherein said support portions include an outer gripping material co-molded with a base housing material.

11. The invention of claim 8 wherein said data entry means is incorporated into said display device so that data entry can be effected manually by the user.

* * * * *